(No Model.) 2 Sheets—Sheet 1.
J. B. PITCHFORD & A. S. COOPER.
MIXING MACHINE FOR ASPHALT.
No. 467,302. Patented Jan. 19, 1892.
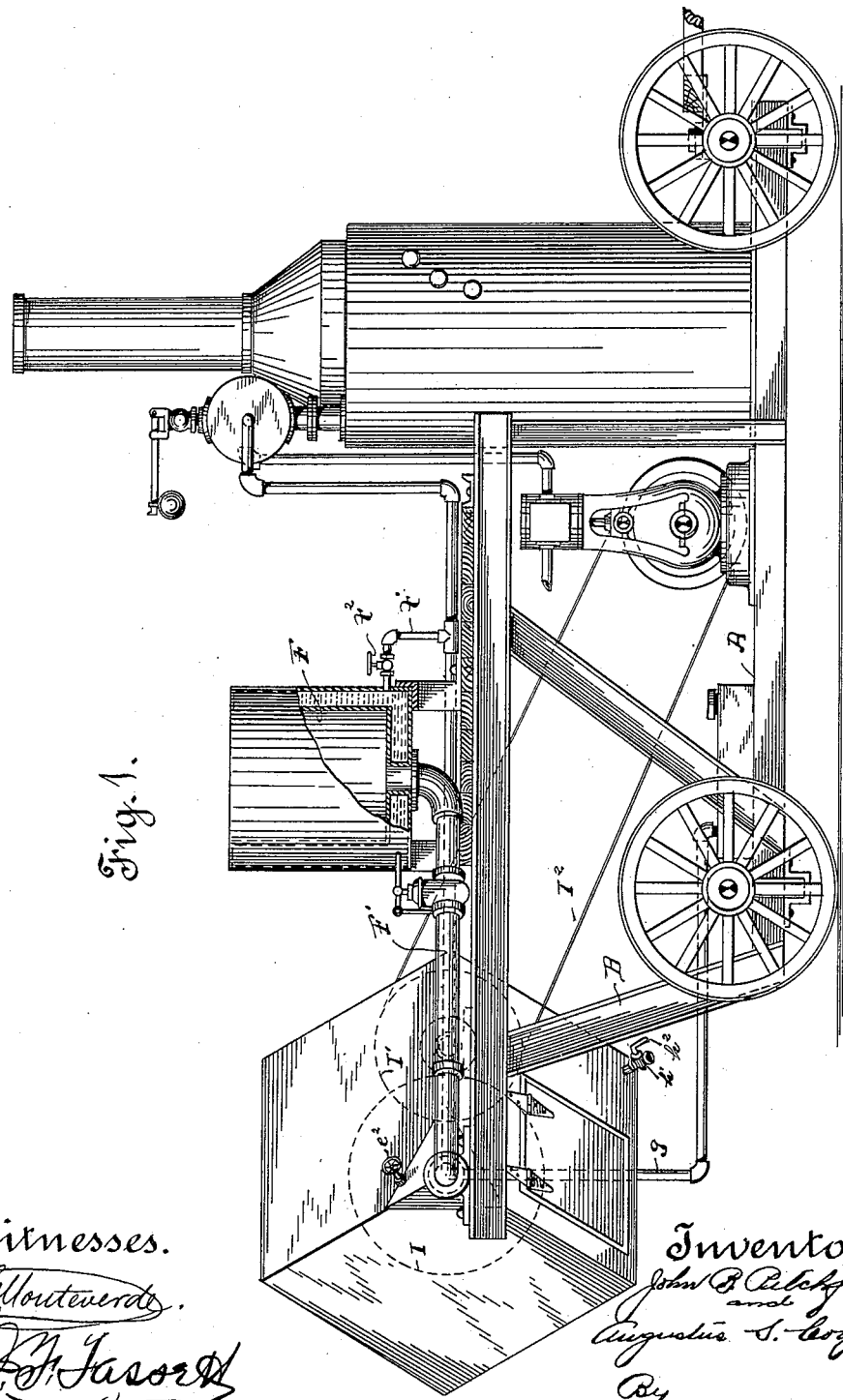

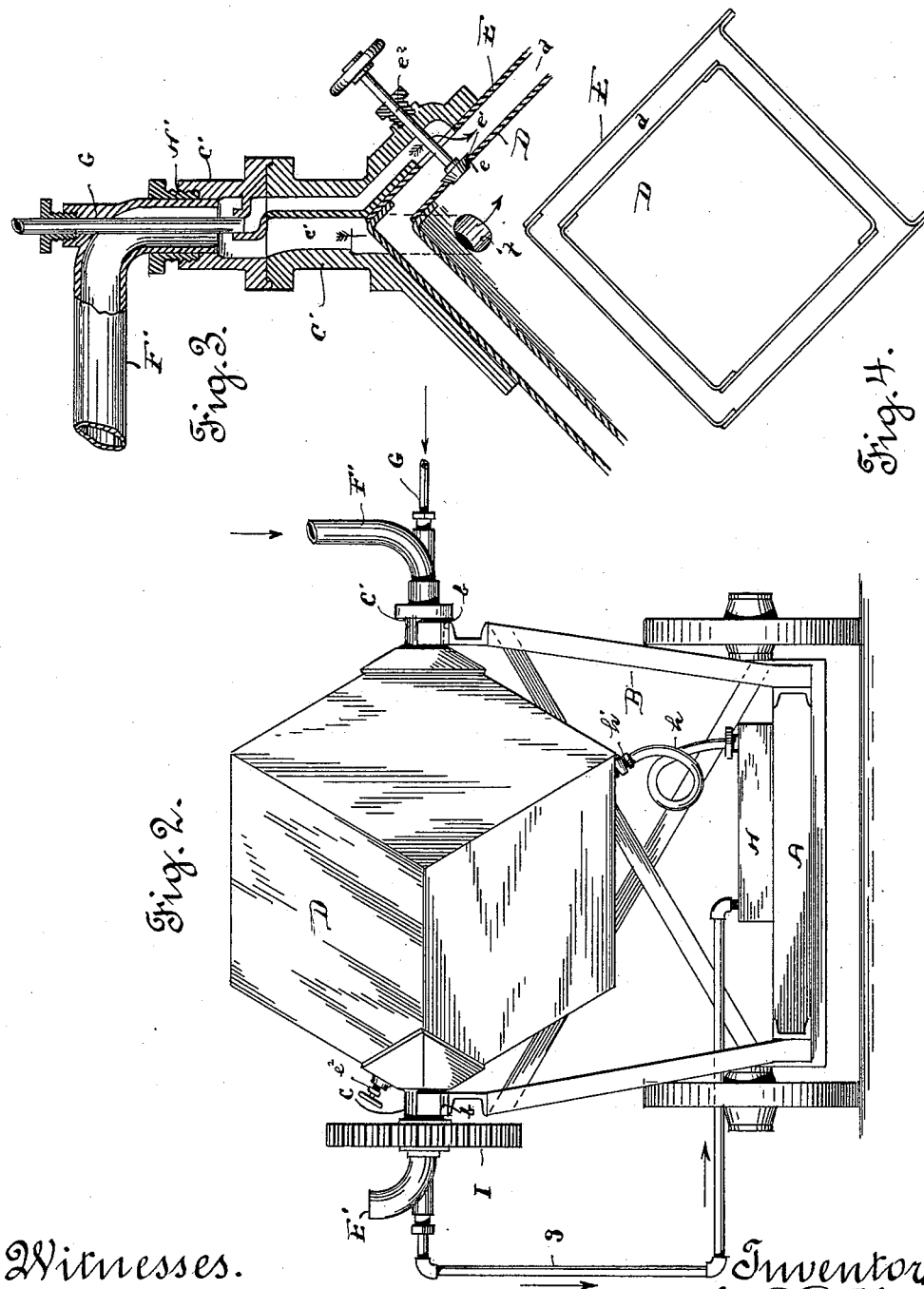

UNITED STATES PATENT OFFICE.

JOHN B. PITCHFORD, OF SAN FRANCISCO, AND AUGUSTUS STEIGER COOPER, OF SANTA BARBARA, ASSIGNORS TO THE CALIFORNIA PETROLEUM AND ASPHALT COMPANY, OF SAN FRANCISCO, CALIFORNIA.

MIXING-MACHINE FOR ASPHALT.

SPECIFICATION forming part of Letters Patent No. 467,302, dated January 19, 1892.

Application filed October 2, 1891. Serial No. 407,519. (No model.)

*To all whom it may concern:*

Be it known that we, JOHN B. PITCHFORD, residing at San Francisco, in the county of San Francisco and State of California, and AUGUSTUS STEIGER COOPER, residing at Santa Barbara, in the county of Santa Barbara and State of California, have invented certain new and useful Improvements in Mixing-Machines for Asphalt, &c.; and we do hereby declare the following to be a full, clear, and exact description of said invention, such as will enable others skilled in the art to which it most nearly appertains to make, use, and practice the same.

Our invention has relation to certain new and useful improvements in mixers for combining gravel and asphaltum or sand and asphaltum, which consists in the arrangement of parts and details of construction, as will be hereinafter more fully set forth in the drawings, described, and pointed out in the specification.

The object of our invention is to provide a mixer wherein the combined gravel and asphaltum will be thoroughly combined by rotation of the holding-receptacle and which at the same time may be retained in a heated condition until removed from the mixer, and in the providing for admission of steam into the mixer in order to disintegrate the bitumen, and in allowing for the steam employed for disintegration to be carried off by evaporation.

The invention further consists in providing a mixer which shall be simpler of construction, less expensive, more durable, and more effectual in its operation than any device of a similar nature heretofore known to us.

Referring to the drawings forming a part of this specification, wherein similar letters of reference denote corresponding parts throughout the entire specification, Figure 1 is a side view in elevation showing our improved mixer connected to the engine; Fig. 2, a front view in elevation of Fig. 1; Fig. 3, a detail sectional view through one of the hollow trunnions, showing steam-jacketed mixer secured therein and means for introducing steam and mixed asphaltum; and Fig. 4, a cross-section of mixer removed from trunnions, showing manner in which same is formed.

The letter A is used to indicate the ordinary truck-platform, and B the uprights projecting therefrom and in bearing $b$, of which we mount hollow trunnions C C', within and to which we bolt or otherwise secure steam-jacketed mixer D. In form we prefer to make the mixer or agitator polyhedral, so that as the same rotates the combined gravel and asphaltum will be carried upward and allowed to drop, thus thoroughly mixing the two, which would not result in case the mixer was made cylindrical so perfectly. The mixer or box D is surrounded by the steam-jacket E, which forms steam space or passage $d$, into which is introduced steam through one of the hollow trunnions, say, C', and thus surrounds the mixer or box, thus serving to maintain the asphaltum contained therein always in a heated condition.

In order to admit steam into the interior of the mixer, we provide the steam-inlet opening $e$, controlled by means of valve $e'$, which is seated or unseated by moving valve-stem $e^2$ in or out. As the valve is unseated the steam flows from the steam-passage into the interior of the mixer, and when sufficient has entered therein the steam-opening is closed by seating valve $e'$, which causes the steam to remain within the steam-passage and surround the mixer. The moisture created by the steam introduced into the mixer will be carried off by evaporation, caused by heat of steam in the surrounding jacket, through vent E', which passes through opposite hollow trunnion C. The asphaltum and gravel flow from hopper F, through feed-pipe F', and, passing through hollow trunnion C', enter the mixer by means of an opening $f$. The feed-hopper is steam-jacketed in order to maintain the gravel and asphaltum in a heated condition before entering the mixer, and steam is admitted thereto through branch pipe $f'$, which is controlled by means of valve $f^2$. As will be observed by reference to Fig. 3, the steam-pipe G, which admits steam to passage $d$, passes through hollow trunnion C', which at the same time forms passage $c'$, through which the asphaltum and sand or gravel passes. When the steam-passage $d$ becomes more than half-full of water, resulting from condensation of steam contained therein, the same flows therefrom through pipe $g$ into feed-water tank H, located at any suitable place beneath the mixer or box. This pipe passes through hollow trunnion C, as shown in Fig. 2. However, should the rotation of mixer be stopped before steam-space $d$ becomes filled with condensed water, then we drain the passage-way by securing hose $h$ to coupler $h'$ projecting from the steam-jacket, and turning key $h^2$. This connecting-hose conveys the retained water to the feed-water tank, same as pipe $g$, and provides for perfect drainage of the passage $d$ when the mixer is not working. The trunnion C' turns upon the sleeve H', and motion is imparted thereto and to mixer through the medium of large gear I, which meshes with smaller gear I', motion to which is transmitted by means of drive-belt $I^2$.

It will be observed that our mixer may be rotated during travel of the truck from place to place, as well as when stationary. In order to allow for the exit of the material from within the mixer, we provide the door K in the side thereof, which at the same time allows the material to be dumped into carts or wagons.

Having thus described our invention, what we claim as new, and desire to secure protection in by Letters Patent of the United States, is—

1. In a concrete-mixer, the combination, with the polyhedral mixer inclosed within a steam-jacket, of the hollow trunnions to which the mixer is secured, steam-inlet pipe for the mixer, and the steam-valve for controlling the flow of steam from the steam-jacket to the interior of the mixer, as and for the purpose set forth.

2. The combination, with the steam-jacketed polyhedral mixer provided with openings for admission of steam and concrete, of a valve for controlling the steam-opening, hollow trunnions to which the jacketed mixer is secured, feed and steam pipes passing through one of said trunnions, and the escape-vent passing through the other trunnion for carrying off the evaporation from interior of mixer, as and for the purpose set forth.

3. In a concrete-mixing apparatus, the combination, with the steam-jacketed polyhedral mixer, of the hollow trunnions to which the mixer is secured and through which the steam and asphaltum are fed and the escape-pipe leading from the steam-passage surrounding the mixer, as and for the purpose set forth.

4. In a mixing apparatus, the combination, with the hollow trunnions, of the polyhedral mixer secured to and rotating with the trunnions, said mixer steam-jacketed, so as to form a surrounding steam-passage, steam-pipe leading to the passage, valve for controlling admission of steam to the interior of the mixer, escape-vent for carrying off the evaporated steam from the mixer, feed-pipe passing through one of the hollow trunnions for admission of concrete or the like to the mixer, and the escape-pipe for carrying off the condensed steam from the steam-passage, as and for the purpose set forth.

In testimony whereof we affix our signatures in presence of two witnesses.

JOHN B. PITCHFORD.
AUGUSTUS STEIGER COOPER.

Witnesses:
N. A. ACKER,
W. N. COWLES.